United States Patent
Kim (10) Patent No.: US 6,556,248 B1
(45) Date of Patent: Apr. 29, 2003

(54) HYPER TEXT MARKUP LANGUAGE (HTML) DATA TRANSMITTING/RECEIVING APPARATUS

(75) Inventor: Joo Won Kim, Kumi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/095,128

(22) Filed: Jun. 10, 1998

(30) Foreign Application Priority Data

Jun. 10, 1997 (KR) .............. 97-23754

(51) Int. Cl.[7] .............................. H04N 7/08
(52) U.S. Cl. ..................... 348/478; 348/465
(58) Field of Search ............... 348/473, 478, 348/552, 468, 465, 493; 725/136, 137

(56) References Cited

U.S. PATENT DOCUMENTS

| | | | | |
|---|---|---|---|---|
| 4,683,490 A | * | 7/1987 | Strolle | 348/493 |
| 5,982,445 A | * | 11/1999 | Eyer et al. | 348/461 |
| 6,018,764 A | * | 1/2000 | Field et al. | 709/217 |
| 6,058,430 A | * | 5/2000 | Kaplan | 709/245 |
| 6,075,568 A | * | 6/2000 | Matsuura | 348/478 |
| 6,084,638 A | * | 7/2000 | Hare et al. | 348/552 |
| 6,199,206 B1 | * | 3/2001 | Nishioka et al. | 725/51 |

* cited by examiner

*Primary Examiner*—Victor R. Kostak
(74) *Attorney, Agent, or Firm*—Birch, Stewart, Kolasch & Birch, LLP (57) ABSTRACT

A HTML data transmitting/receiving apparatus selectively inserts an NTSC broadcasting signal and a HTML signal into a VHF or UHF broadcast channel and thus performing data transmitting and receiving process. The apparatus of the present invention inserts the HTML data signal in an image signal interval corresponding to a predetermined TV channel and transmits the HTML data signal in a caption region and a teletext region in a vertical blanking interval or in a caption region, a teletex region and an image signal interval therein.

9 Claims, 6 Drawing Sheets

(A) FIELD 1

| LINE | CLASSIFICATION | REFERENCE |
|---|---|---|
| 1 ... 9 | SYNCHRONOUS SIGNAL | (9) |
| 10 ... 20 | VBI | (11) |
| 21 22 ... 262 | IMAGE DATA | (242) |

(B) FIELD 2

| LINE | CLASSIFICATION | REFERENCE |
|---|---|---|
| 263 ... 271 | SYNCHRONOUS SIGNAL | (9) |
| 272 ... 283 | VBI | (11) |
| 284 ... 525 | IMAGE DATA | (242) |

HYPER TEXT MARKUP LANGUAGE (HTML) DATA TRANSMITTING/RECEIVING APPARATUS

BACKGROUND OF THE INVENTION

1. Field of the Invention

The present invention relates to an image signal processor, and in particular to a hyper text markup language (HTML) data transmitting/receiving apparatus capable of selectively inserting an NTSC broadcasting signal and a HTML signal into a VHF or UHF broadcast channel and thus performing data transmitting and receiving process.

2. Description of the Conventional Art

In a general TV broadcast system, a broadcast program which is transmitted through a cable or wireless transmission is displayed on a receiving apparatus such as a TV set and a user may select a program by using the TV broadcast system.

When using the general TV broadcast system, the user only can watch the programs that broadcasting stations transmit, and therefore can not receive various information such as shopping information, stock information, etc.

Accordingly, an intercast art has recently been proposed. In the intercast art, a transmitting side inserts and transmits certain information in a vertical blanking interval (VBI) of the TV broadcast signal together with the TV program, and a receiving side restores and displays the information inserted in the VBI of the TV broadcast signal.

The intercast art, devised by the Intel Corp., is the technique which transmits the shopping or stock information which is converted to the HTML data by loading in the VBI of the TV broadcast signal. Here, in an NTSC broadcast system about 21 lines are used in the VBI.

Consequently, the receiving side decodes the HTML data signal from the VBI of the TV broadcast signal, thus the user can easily receive various information, simply using an intercast key provided in a remote control.

However, in the conventional intercast art, since the interval into which the HTML signal is inserted in a field of the TV broadcast signal is limited to about 21 lines, thus the user may have a difficulty in receiving more various information due to the limitation of information volume.

SUMMARY OF THE INVENTION

Accordingly, it is an object of the present invention to provide a HTML data transmitting/receiving apparatus that transmits HTML data to an image signal interval of a particular channel and thus easily receives various information from an internet.

It is another object of the present invention to provide a HTML data transmitting/receiving apparatus that broadcasts HTML data by loading the data in a caption region and a teletext region or in a caption region, a teletext region and an image signal interval.

To achieve the above objects, there is provided a HTML data transmitting apparatus which includes a HTML converter for converting a HTML data, which is generated in an ASCII type in a computer, to an ASCII type of a teletext, a HTML encoder for generating a composite image signal in accordance with primary color signals, and loading the HTML data signal outputted from the HTML converter into a vertical flyback interval of the composite image signal, and a broadcast device for transmitting a signal outputted from the HTML encoder through an antenna.

To achieve the above objects, there is provided a HTML data receiving apparatus which includes VIF and AIF processors for separating a high frequency composite image signal outputted from a tuner into a video intermediate frequency signal and an audio intermediate frequency signal, a TV decoder for decoding a TV image signal from the video intermediate frequency signal, a HTML decoder for restoring HTML video and HTML audio signals from the video intermediate frequency signal, a video output unit for processing a TV image signal outputted from the TV decoder or a HTML image signal outputted from the HTML decoder, and thus displaying a resultant signal on a color picture tube in accordance with the control of a microcomputer, and an audio output unit for processing the audio intermediate frequency signal outputted from the AIF processor or the HTML audio signal outputted from the HTML decoder, and thus outputting a resultant signal to a speaker in accordance with the control of the microcomputer.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
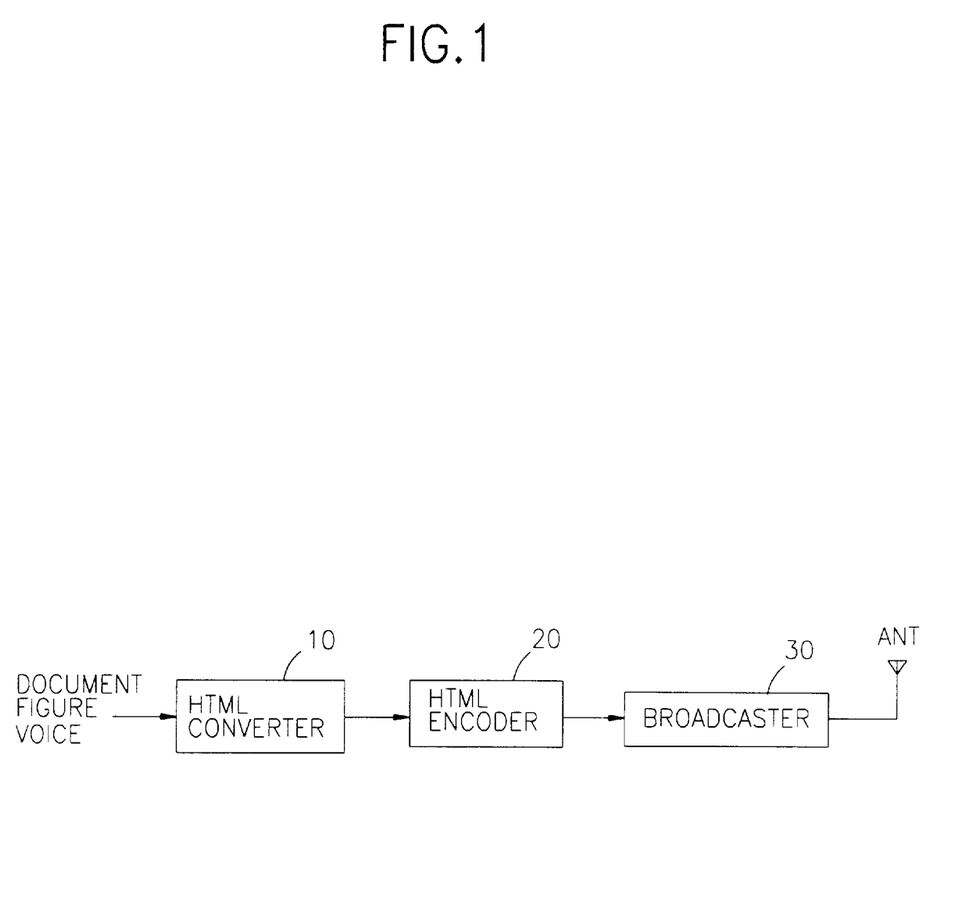
FIG. 1 is a schematic block diagram of a HTML data transmitting apparatus according to the present invention.

As shown in FIG. 1, a HTML data transmitting apparatus includes a HTML converter 10 for converting a HTML data which is generated in an ASCII type in a computer to an ASCII type of a teletext, a HTML encoder 20 for switching the HTML data signal outputted from the HTML converter 10 to a vertical flyback interval of the composite image signal and a broadcaster 30 for adding a color burst signal and a synchronous signal to an output signal from the HTML encoder, thereby transmitting a TV image signal over an antenna.

Figure 2:
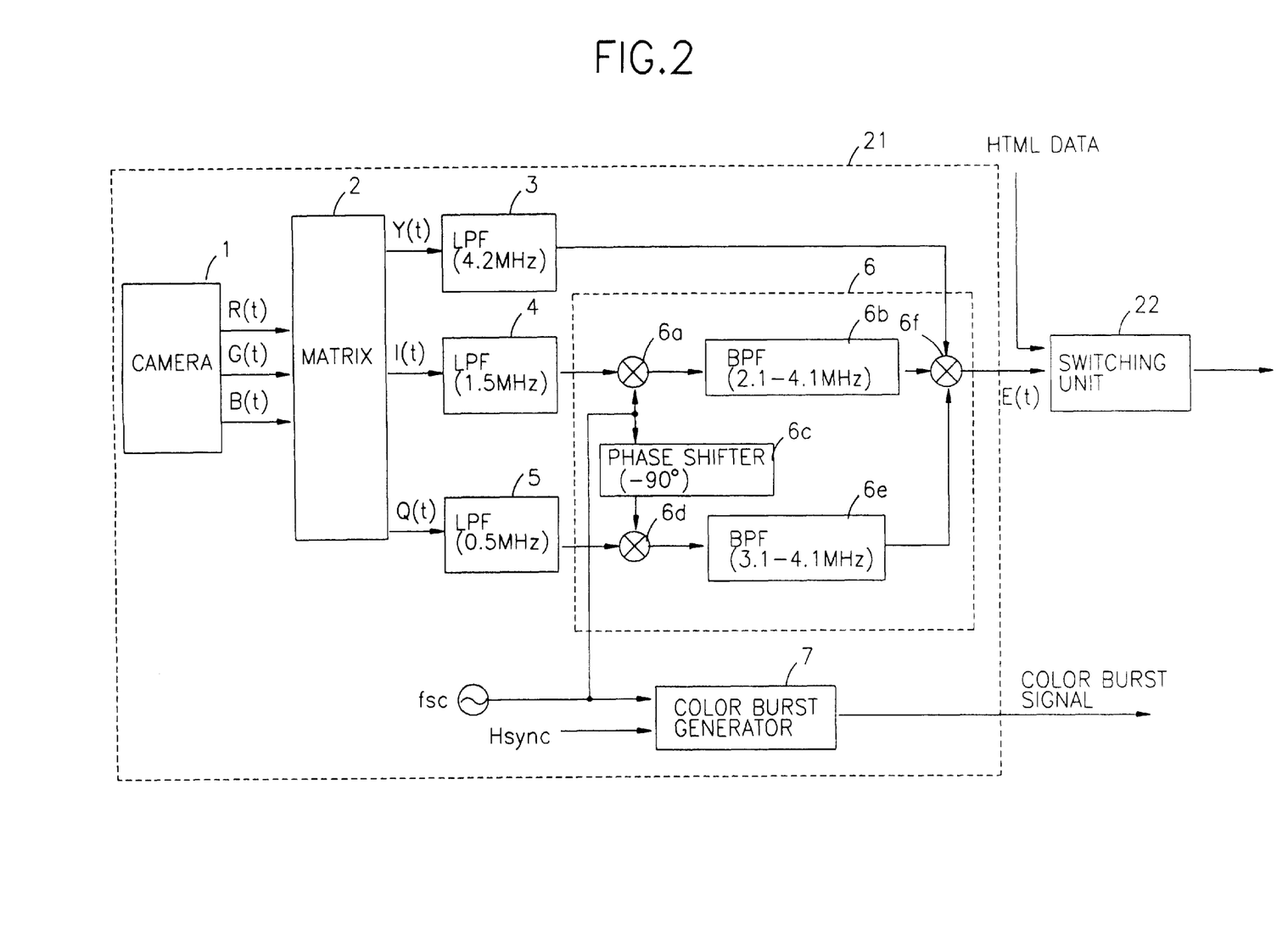
FIG. 2 is a diagram illustrating a HTML encoder in FIG. 1.

The HTML encoder 20, as shown in FIG. 2, is provided with a composite image signal generating unit 21 modulating a RGB signal to a chrominance carrier wave, thereby generating a color burst signal and a composite image signal E(t) of a frequency band of 0–4.2 Mhz and a switching unit 22 for switching the composite image signal E(t) from the composite image signal generating unit 21 and the HTML data.

The composite image signal generating unit 21 is composed of a matrix 2 for generating a luminance signal Y(t)

and chrominance signals I(t) and Q(t) in accordance with primary color signals R(t), G(t) and B(t) which are outputted from a camera 1, three low pass filters (LPF) 3–5 filtering the luminance signal Y(t) and the chrominance signals I(t) and Q(t), respectively, outputted from the matrix 2 in each predetermined frequency band, that is, 4.2 MHz, 1.5 MHz and 0.5 MHz, a modulator 6 performing a quadrature amplitude modulation QAM of each of signals outputted from the LPFs 4 and 5 to each chrominance carrier wave fsc and adding an output signal from the LPF 3 thereto, thereby generating the composite image signal E(t) and a color burst generator 7 generating a color burst signal in accordance with the chrominance carrier wave fsc and a horizontal synchronous signal Hsync.

Figure 3:
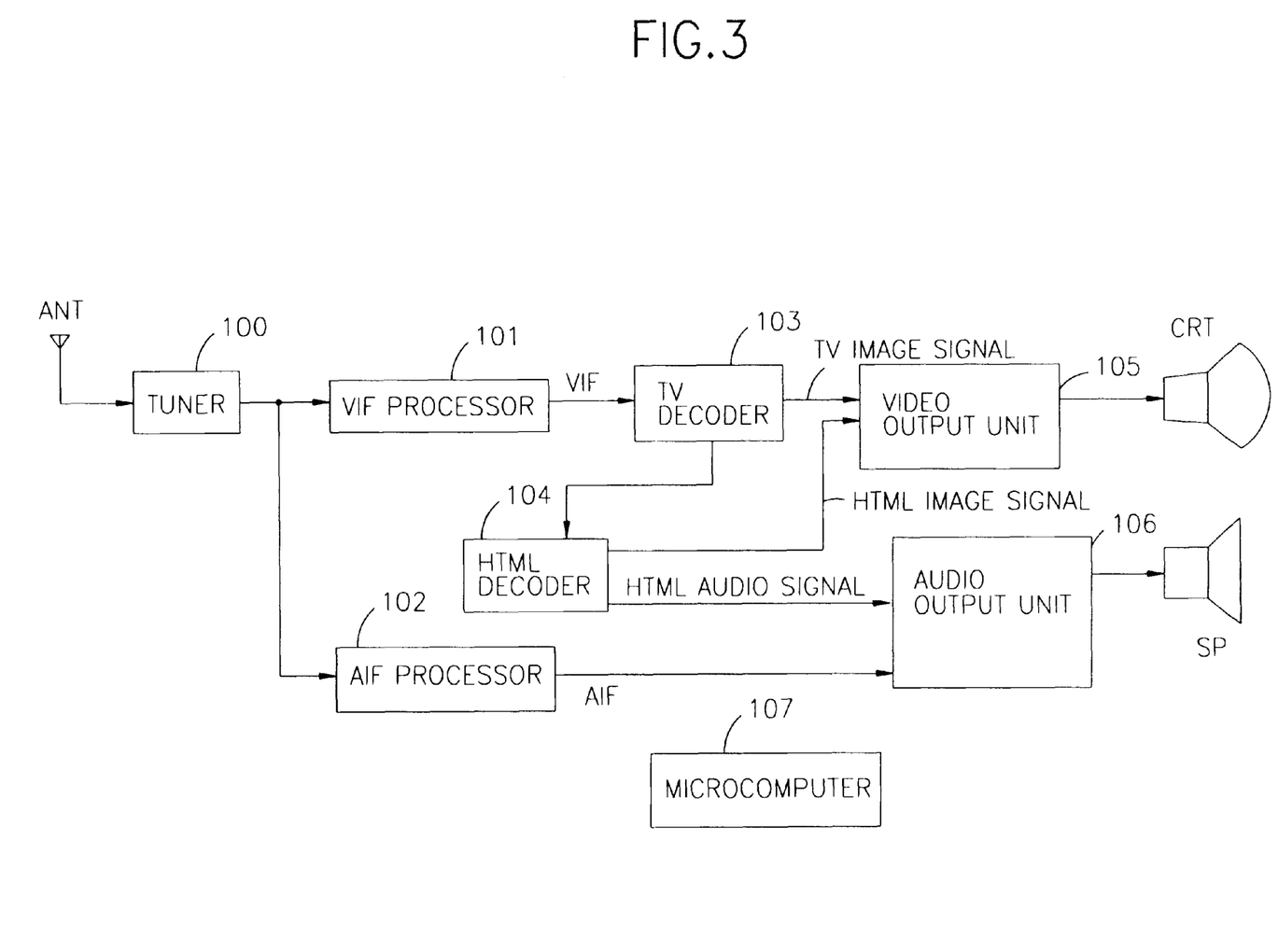
FIG. 3 is a schematic block diagram of a HTML data receiving apparatus according to the present invention.
Figure 4:
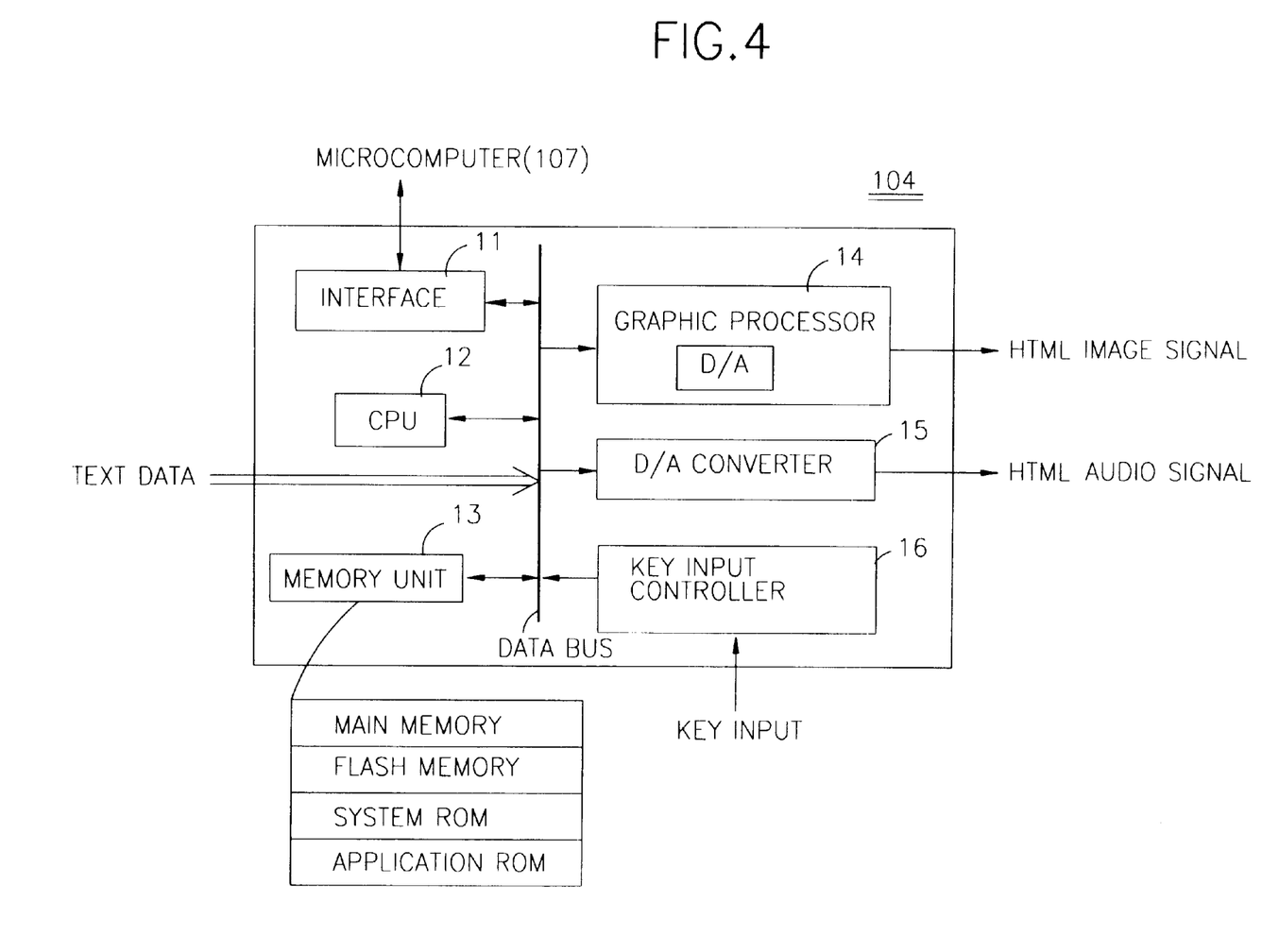
FIG. 4 is a diagram illustrating a HTML decoder in FIG. 3.

The modulator 6 is composed of a mixer 6a for performing the QAM of the output signal from the LPF 4 to the chrominance carrier wave fsc, a BPF 6b filtering an output signal from the mixer 6a in a frequency band between 2.1–4.1 MHz, a phase shifter 6c for shifting a phase of the chrominance carrier wave fsc for −90°, a mixer 6d for performing the QAM of the output signal from the LPF 5 to an output signal from the phase shifter 6c, a BPF 6e filtering an output signal from the mixer 6d in a frequency band between 3.1–4.1 MHz and an adder 6f for adding the signals outputted from the BPFs 6b and 6e and a signal outputted from the LPF 3, thus generating the composite image signal E(t). FIG. 3 is a block diagram of a HTML data receiving apparatus according to the present invention in which a HTML decoder 104 is additionally provided to a general TV receiving apparatus. The detail construction of the HTML decoder 104 is illustrated in FIG. 4.

As shown therein, the HTML decoder 104 is composed of an interface 11 interfacing data between an external microcomputer 107 and a data bus, a CPU 12 restoring the HTML image and audio data from text data outputted from a TV decoder 103, a memory unit 13 storing the HTML image and audio data, a graphic processor 14 converting the HTML image data signal to an analog signal and performing on-screen and graphic processes, a D/A converter 15 converting the HTML audio data signal from the memory unit 13 to an analog signal and a key input controller 16 controlling a key input.

The memory unit 13 is comprised of a main memory for loading data in an application program operation, a flash memory for storing system related information such as IDs, passwords and telephone numbers, a system memory applied to a system BIOS, and video VIOS and OS and an application ROM for supporting the programs of the whole system.

Now, the HTML data transmitting operation according to the present invention will be described.

First, the HTML converter 10 on the transmitting side receives HTML data which are generated in an ASCII type in a computer, such as documents, figures, voices, etc., and converts the HTML data to an ASCII type of a teletext.

The HTML encoder 20 generates, in the composite image signal generating unit 21, the composite image signal E(t) in accordance with an optical image signal of an object, and generates the color burst signal and the synchronous signal in accordance with the chrominance carrier wave fsc and the horizontal synchronous signal Hsync and switches the composite image signal E(t) and the HTML data outputted from the HTML converter 10 in the switching unit 22.

That is, the camera 1 of the composite image signal generating unit 21 converts the optical image signal of the object to the primary color signals R(t), G(t) and B(t), and the matrix 2 thereof generates the luminance signal Y(t) and the chrominance signals I(t) and Q(t) from the converted signals R(t), G(t) and B(t), as the following equation (1).

$$Y(t)=0.30R(t)+0.59G(t)30\ 0.11B(t)$$
$$I(t)=0.60R(t)-0.28G(t)-0.32B(t)$$
$$Q(t)=0.21R(t)-0.52G(t)-0.31B(t) \quad (1)$$

Next, each of the LPFs 3–5 performs filtering the luminance signal Y(t) and the chrominance signals I(t) and Q(t) in each of frequency bands, 4.2 MHz, 1.5 MHz, and 0.5 MHz, respectively, and the mixer 6a of the modulator 6 performs the QAM of the output signal from the LPF 4 to the chrominance carrier wave fsc, and the mixer 6d thereof performs the QAM of the output signal from the LPF 5 to the chrominance carrier wave fsc of which a phase is shifted for −90° in the phase shifter 6c.

Accordingly, the adder 6f adds the output signal from the mixer 6a, which is filtered to 2.1–4.1 MHz in the BPF 6b, and the output from the mixer 6d, which is filtered to 3.1–4.1 MHz in the BPF 6e, thus generating a single chrominance signal C(t), and then adds the chrominance signal C(t) to the luminance signal Y(t) which is filtered to 4.2 MHz in the LPF 3, thereby outputting the composite image signal E(t), as the following equation (2).

$$E(t)=Y(t)+C(t)=Y(t)+I(t)\cos(2\pi \mathrm{fct})+Q(t)\sin(s\pi \mathrm{fct}) \quad (2)$$

Figure 5:
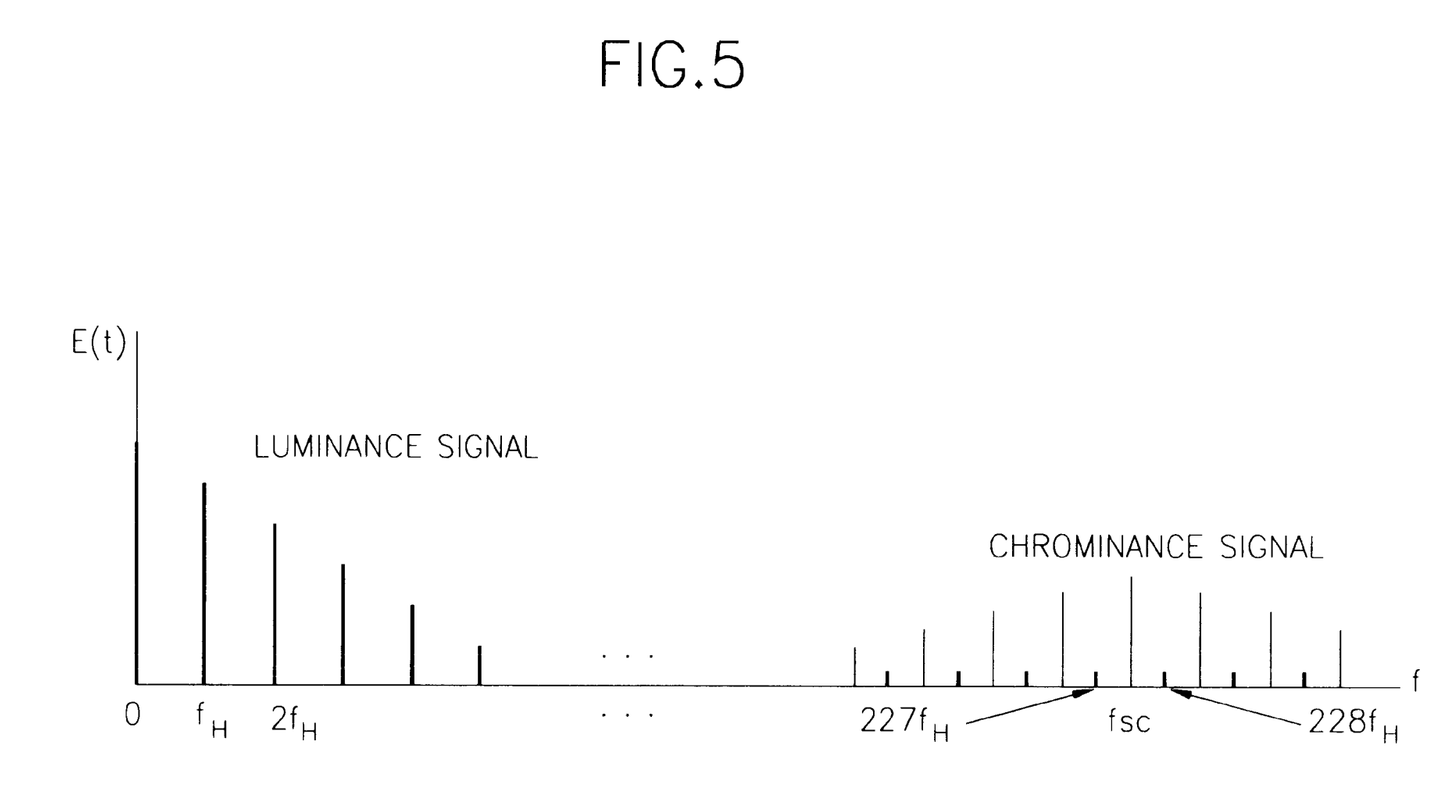
FIG. 5 is a diagram illustrating that luminance and chrominance signals scatteredly inserted in a frequency in a composite image signal.

Here, the FIG. 5 illustrates frequency spectrums of the composite image signal E(t), wherein the luminance signal Y(t) and the chrominance signal C(t) are scatteredly inserted in the frequency thereof.

Figure 6:
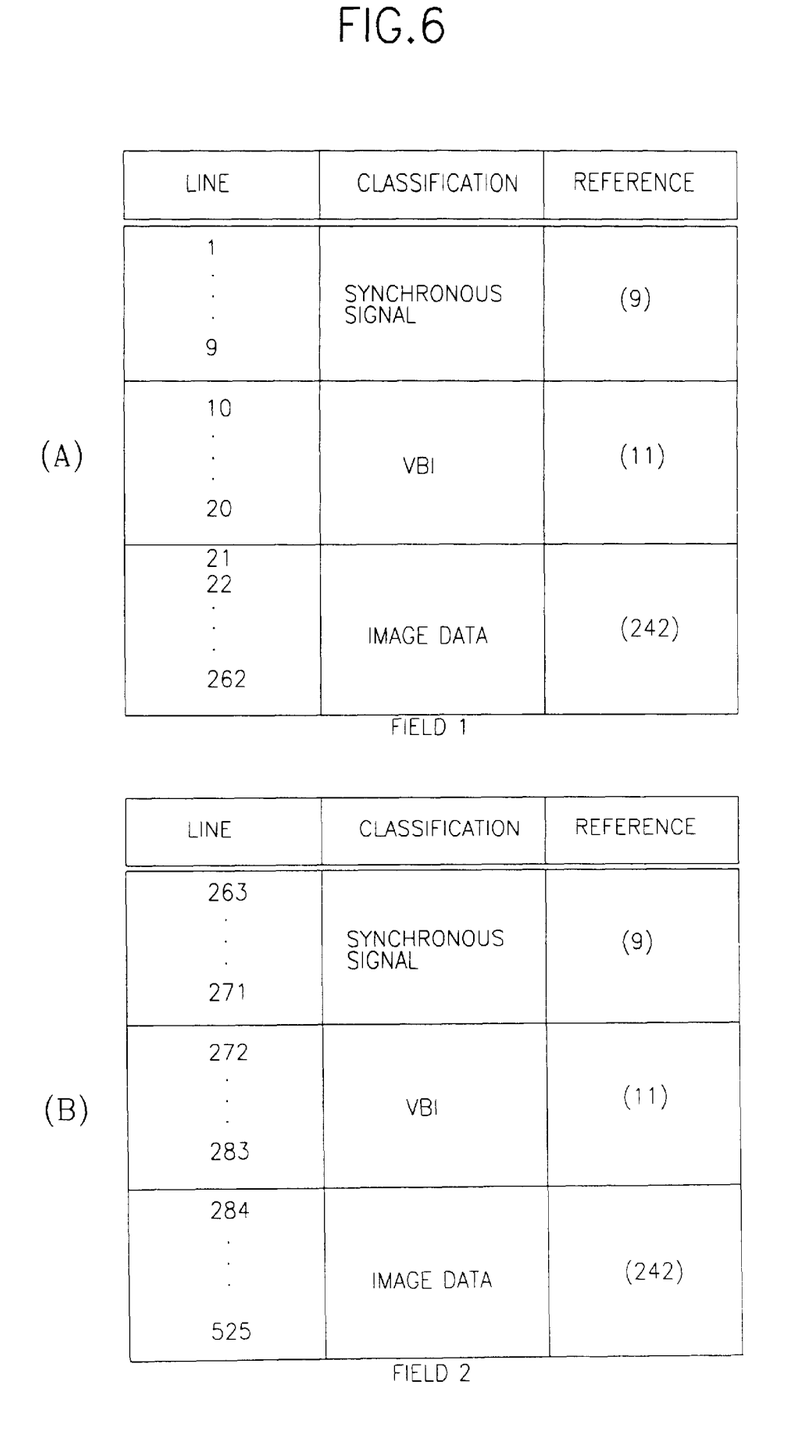
FIGS. 6A and 6B are field format diagrams illustrating a data format of 1 frame of a TV image signal according to the present invention.

The switching unit 22 selectively outputs the composite image signal E(t) outputted from the composite image signal generating unit 21 or the HTML data signal from the HTML converter 10. The broadcaster 30 generates and outputs a TV image signal of 1 frame, as shown in FIGS. 6A and 6B in accordance with a clock synchronous signal and a byte synchronous signal. Here, the frame of the TV image signal is composed of a pair of fields (field 1, field 2), that is 525 lines.

In FIGS. 6A and 6B, lines 1 through 20 of the field 1 and lines 263 through 283 of the field 2 are vertical blanking intervals (VBI), and lines 21 though 262 of the field 1 and lines 284 through 525 are intervals for loading image data signals.

Further, among VBIs the lines 1 through 9 of the field 1 and the lines 263 through 271 of the field 2 are regions for loading synchronous signals used as a control signal of TV, whereas the lines 10 through 20 of the field 1 and lines 272 through 283 of the field 2 are regions for caption, ghost cancelling reference and teletext information.

Accordingly, in the present invention the composite image signal E(t) is transmitted over the lines 21 to 262 of the field 1 and the lines 284 to 525 of the field 2 and the HTML data signal is inserted to the image signal interval of a particular channel instead of the composite image signal E(t).

Next, the HTML data receiving operation according to the present invention will be described.

In a general TV watching, if a user selects a channel using a remote control, the tuner 100 selects a corresponding channel in accordance with the control of the microcomputer 107 and outputs the composite image signal corresponding to the selected channel. Next, the VIF and AIF processors 101 and 102 output an image intermediate frequency signal VIF and an audio intermediate frequency signal AIF, respectively.

The TV decoder 103 demodulates the image intermediate frequency signal VIF outputted from the VIF processor 101 to the TV image signal and the HTML signal, and supplies the TV image signal to the video output unit 105 and slices the HTML signal, thereby converting to a text code.

The HTML decoder 104 receives the text code from the TV decoder 103 and, using the CPU 12, restores the HTML image data and the HTML audio data therefrom and stores the HTML image and audio data in the memory unit 13. The restored HTML image data signal is converted to an analog signal in the graphic processor 14 and the on-screen and graphic processes are performed thereto, while the restored HTML audio data signal is . converted to an analog signal in the D/A converter 15.

The video output unit 105 supplies the TV image signal outputted from the TV decoder 103 or a HTML image signal of a particular channel outputted from the HTML decoder 104 to a color picture tube CPT. The audio output unit 106 processes the audio intermediate frequency signal AIF outputted from the AIF processor 102 or a HTML audio signal of the particular channel outputted from the HTML decoder 104 and outputs the processed signal to a speaker SP, so that the user can receive the various information from the internet using the TV set by selecting the channel in which the HTML data are loaded. Further, since the HTML data are stored in the memory unit 13 of the HTML decoder 104, the user can selectively access the HTML data using a key input.

As another embodiment of the present invention, the HTML data signal may be transmitted by being loaded in a caption region and a teletext region in the VBI or in a caption region, a teletext region and an image signal interval therein.

Currently, the broadcasting stations have their own internet homepage programs and offer TV program information service and real time broadcast service. Thus, the present invention may selectively send/receive information corresponding to a present channel by broadcasting the information loaded in the internet such as a story of a TV program or an introduction of main characters thereof.

In addition, after the broadcast channel (VHF, UHF, cable) is allocated, the HTML data are loaded therein, which is also applicable to NTSC, PAL and SECAM broadcasting systems.

The HTML data transmitting/receiving apparatus according to the present invention transmits the HTML data by loading in an image signal interval of a particular TV channel, thus utilizing various information and receiving the information on the internet using the TV set.

Further, by sending the HTML data into the caption region and the teletext region in the VBI or in the caption region, the teletext region and the image signal interval therein, the user may use the TV program information service and real time broadcast service which are provided in the internet homepage by the broadcasting stations.

As described above, Although the preferred embodiment of the present invention has been disclosed for illustrative purposes, those skilled in the art will appreciate that various modifications, additions and substitutions are possible, without departing from the scope and. spirit of the invention as recited in the accompanying claims.

What is claimed is:

1. In an image signal processing device provided with VIF and AIF processors for separating a radio frequency composite image signal outputted from a tuner into a video intermediate frequency signal and an audio intermediate frequency signal, a video output unit for processing and displaying a TV image signal or a HTML image signal on a color picture tube and an audio output unit for processing and outputting the audio intermediate frequency signal from the AIF processor or a HTML audio signal to a speaker, a HTML data receiving apparatus, further comprising:

a TV decoder modulating the image intermediate frequency signal outputted from the VIF processor to a TV image signal and a HTML signal and slicing the HTML signal thereby converting to a text code; and a HTML decoder receiving the text code from the TV decoder and restoring HTML image and HTML audio data signals from text data, wherein the HTML decoder comprises:

an interface interfacing data between an external microcomputer and a data bus;

a CPU restoring the HTML image and audio data from the text data outputted from the TV decoder;

a memory unit storing the restored HTML image data and HTML audio data;

a key input controller controlling a key input;

a graphic processor converting the HTML image data signal to an analog signal and performing on-screen and graphic processes; and a D/A converter converting the HTML audio data signal from the memory unit to an analog signal.

2. A hyper text markup language (HTML) data transmitting apparatus, comprising:

a HTML converter converting a HTML data signal which is generated in an ASCII type in a computer to an ASCII type of a teletext;

a HTML encoder generating a composite image signal in accordance with primary color signals outputted by a camera and selectively outputting the composite image signal or the HTML data signal outputted from the HTML converter; and a broadcast device inserting an output signal from the HTML encoder in an image signal interval of a predetermined channel, thereby generating and broadcasting a TV image signal of 1 frame;

wherein the broadcast device inserts the HTML data signal in a caption region and a teletext region in a vertical blanking interval.

3. The apparatus of claim 2, wherein the HTML encoder comprises:

a composite image signal generating unit modulating RGB signals which are generated in the camera to chrominance carrier waves and thus generating a color burst signal and a composite image signal in 0–4.2 Mhz; and a switching unit switching the composite image signal outputted from the composite image signal generating unit and the HTML data signal from the HTML converter.

4. The apparatus of claim 2, wherein the composite image signal generating unit comprises:

a matrix generating a luminance signal and chrominance signals in accordance with the RGB signals which are outputted from the camera;

first, second and third low-pass filters respectively filtering the luminance signal and the chrominance signals outputted from the matrix in each predetermined frequency band of 4.2 MHz, 1.5 MHz and 0.5 MHz;

a modulator performing a quadrature amplitude modulation (QAM) of each of signals outputted from the second and third low-pass filters to each chrominance carrier wave and adding an output signal from the first low-pass filter thereto, thereby generating the composite image signal; and a color burst generator generating a color burst signal in accordance with the chrominance carrier wave and a horizontal synchronous signal.

5. The apparatus of claim 4, wherein the modulator comprises:

a first mixer performing the QAM of the output signal from the first low-pass filter to the chrominance carrier wave;

a first BPF filtering an output signal from the first mixer in a frequency band between 2.1–4.1 MHz;

a phase shifter for shifting a phase of the chrominance carrier wave for −90°;

a second mixer for performing the QAM of the output signal from the third low-pass filter to an output signal from the phase shifter;

a second BPF filtering an output signal from the second mixer in a frequency band between 3.1–4.1 MHz; and an adder for adding the output signals from the first and second BPFs and an output signal from the first low-pass filter, thus generating the composite image signal.

6. The apparatus of claim 2, wherein the broadcast device inserts the HTML data signal in a caption region, a teletext region, and an image signal interval in the vertical blanking interval.

7. In a TV image signal transmitting apparatus for broadcasting a TV image signal of 1 frame wherein there are divided a synchronous signal interval, a vertical blanking interval and an image signal interval, a HTML data transmitting apparatus, comprising:

a HTML encoder generating a composite image signal from RGB signals outputted from a camera and selectively outputting the composite image signal or a HTML data signal which is outputted from a HTML converter; and a broadcast device inserting an output signal from the HTML encoder into the image signal interval corresponding to a predetermined channel, thereby generating a TV image signal of 1 frame;

wherein the broadcast device inserts the HTML data signal in a caption region and a teletext region in the vertical blanking interval.

8. The apparatus of claim 7, wherein the HTML encoder comprises:

a composite image signal generating unit modulating RGB signals which are generated in the camera to chrominance carrier waves and thus generating a color burst signal and a composite image signal in 0–4.2 Mhz; and a switching unit switching the composite image singal outputted from the composite image signal generating unit and the HTML data signal from the HTML converter.

9. The apparatus of claim 7, wherein the broadcast device inserts the HTML data signal in a caption region, a teletext region, and an image signal interval in the vertical blanking interval.

* * * * *